United States Patent [19]

Fujimori

[11] Patent Number: 5,027,214
[45] Date of Patent: Jun. 25, 1991

[54] ELECTRONIC STILL CAMERA USING VARIABLE-LENGTH DATA COMPRESSION FOR STORING STILL IMAGE SIGNALS

[75] Inventor: Hiroyoshi Fujimori, Tokyo, Japan

[73] Assignee: Olympus Optical Co., Ltd., Tokyo, Japan

[21] Appl. No.: 506,927

[22] Filed: Apr. 9, 1990

[30] Foreign Application Priority Data

Apr. 20, 1989 [JP] Japan .................................. 1-101461

[51] Int. Cl.$^5$ .............................................. H04N 5/30
[52] U.S. Cl. ................................... 358/209; 358/909; 358/102; 358/310
[58] Field of Search .............. 358/909, 209, 102, 310, 358/10

[56] References Cited

U.S. PATENT DOCUMENTS

| | | | |
|---|---|---|---|
| 4,758,883 | 7/1988 | Kawahra et al. | 358/41 |
| 4,837,628 | 6/1989 | Sasaki | 358/909 |
| 4,907,251 | 3/1990 | Watanabe et al. | 358/909 |

FOREIGN PATENT DOCUMENTS

| | | |
|---|---|---|
| 63-146583 | 6/1988 | Japan . |
| 63-284986 | 11/1988 | Japan . |
| 63-284987 | 11/1988 | Japan . |
| 64-81583 | 3/1989 | Japan . |
| 1-185080 | 7/1989 | Japan . |
| 1-212185 | 8/1989 | Japan . |
| 1220981 | 9/1989 | Japan . |
| 1288186 | 11/1989 | Japan . |

Primary Examiner—James J. Groody
Assistant Examiner—Tuan V. Ho
Attorney, Agent, or Firm—Frishauf, Holtz, Goodman & Woodward

[57] ABSTRACT

An image pick-up section generates an electronic still image signal. An A/D conversion section converts the electronic still image signal generated by the image pick-up section into a digital signal. A data compressing section causes variable-length encoding data compression to the digital signal obtained by the A/D conversion section so as to obtain compressed image data. A recording section records the image data compressed by the data compressing section in a recording medium having a predetermined recording capacity. A calculating section calculates an estimated count of electronic still images which can be recorded in the recording medium in accordance with quantitative data associated with the image data recorded in the recording medium by the recording section and quantitative data associated with the recording capacity of the recording medium. An indicating section indicates the estimated count of the recordable electronic still images calculated by the calculating section.

19 Claims, 5 Drawing Sheets

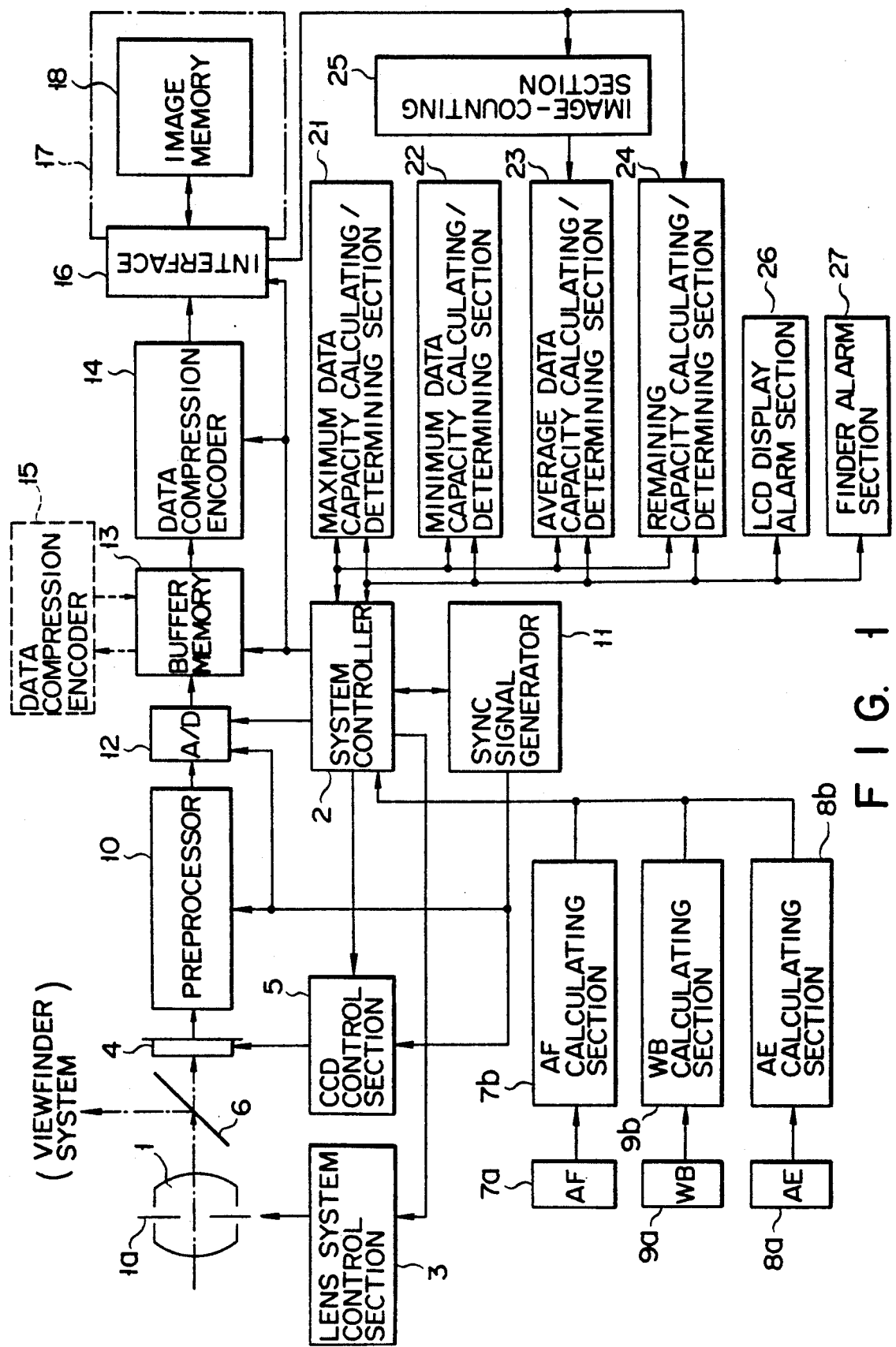
F I G. 1

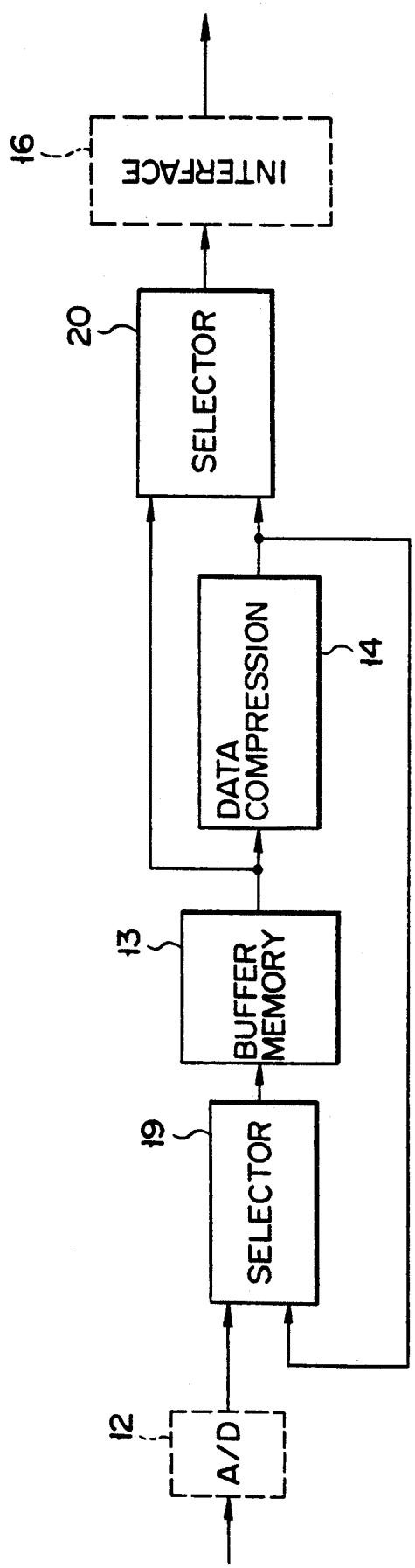
F I G. 2

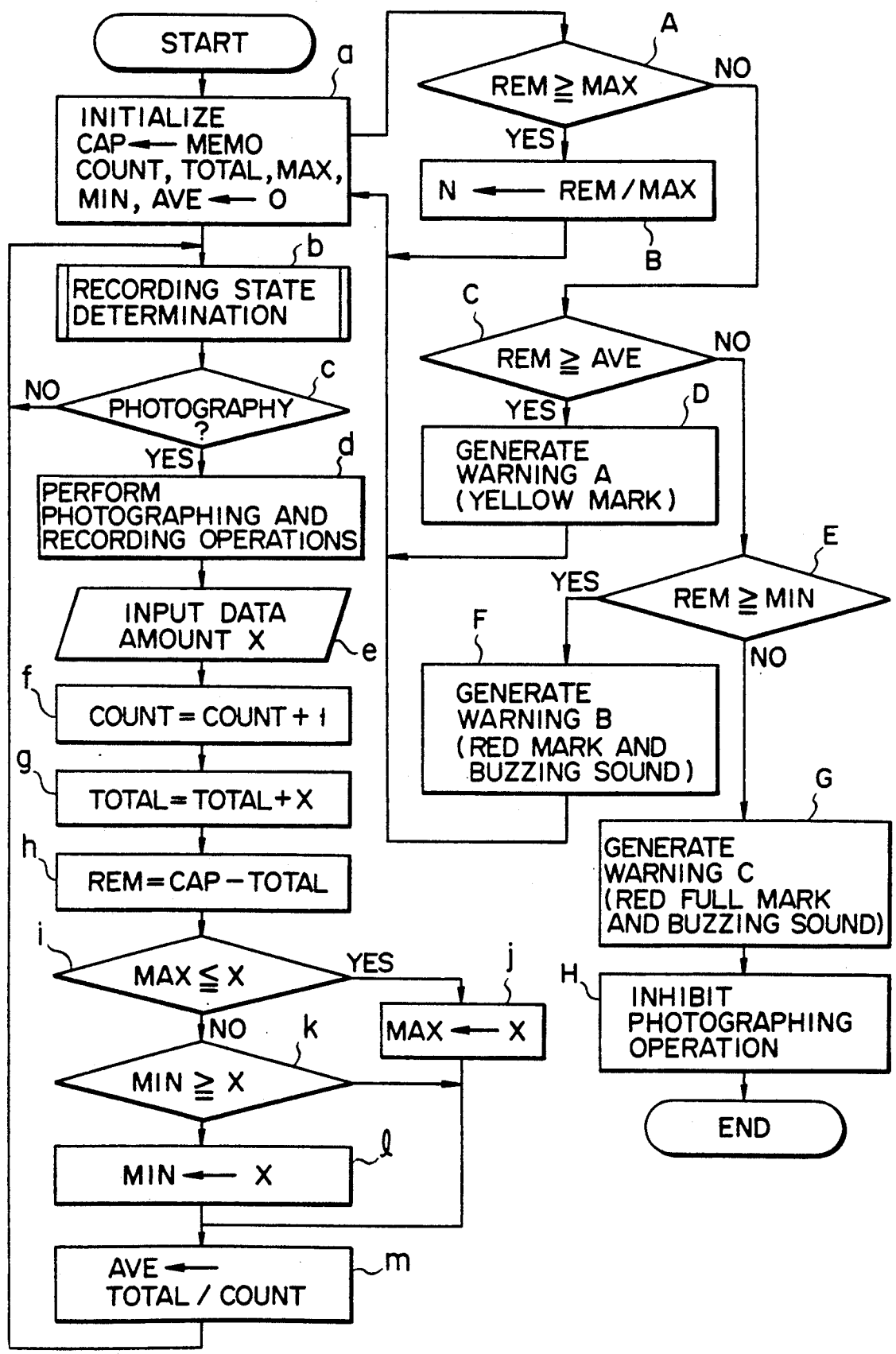
F I G. 3

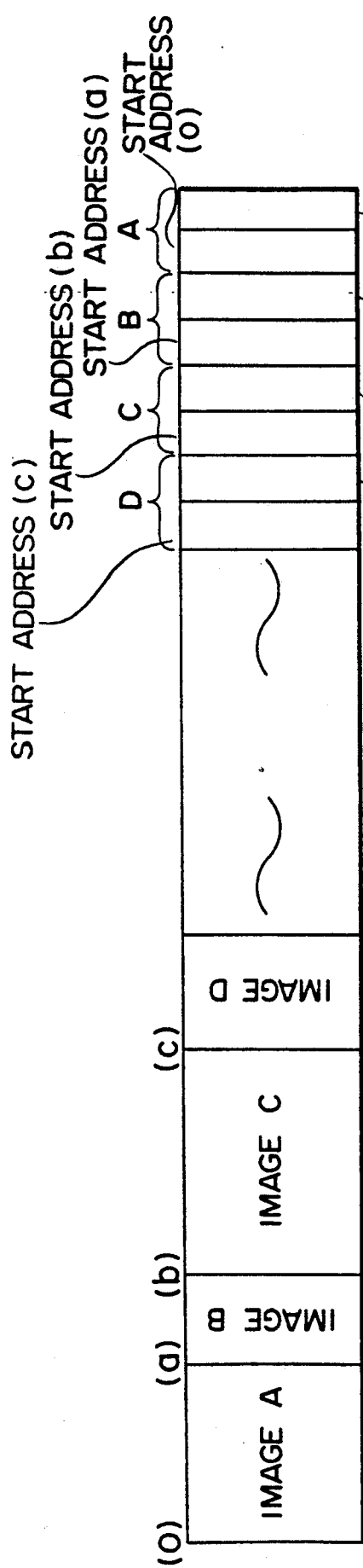
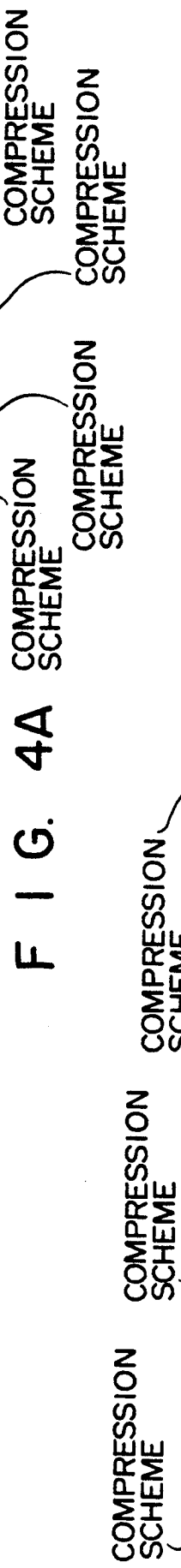
FIG. 4A
FIG. 4B

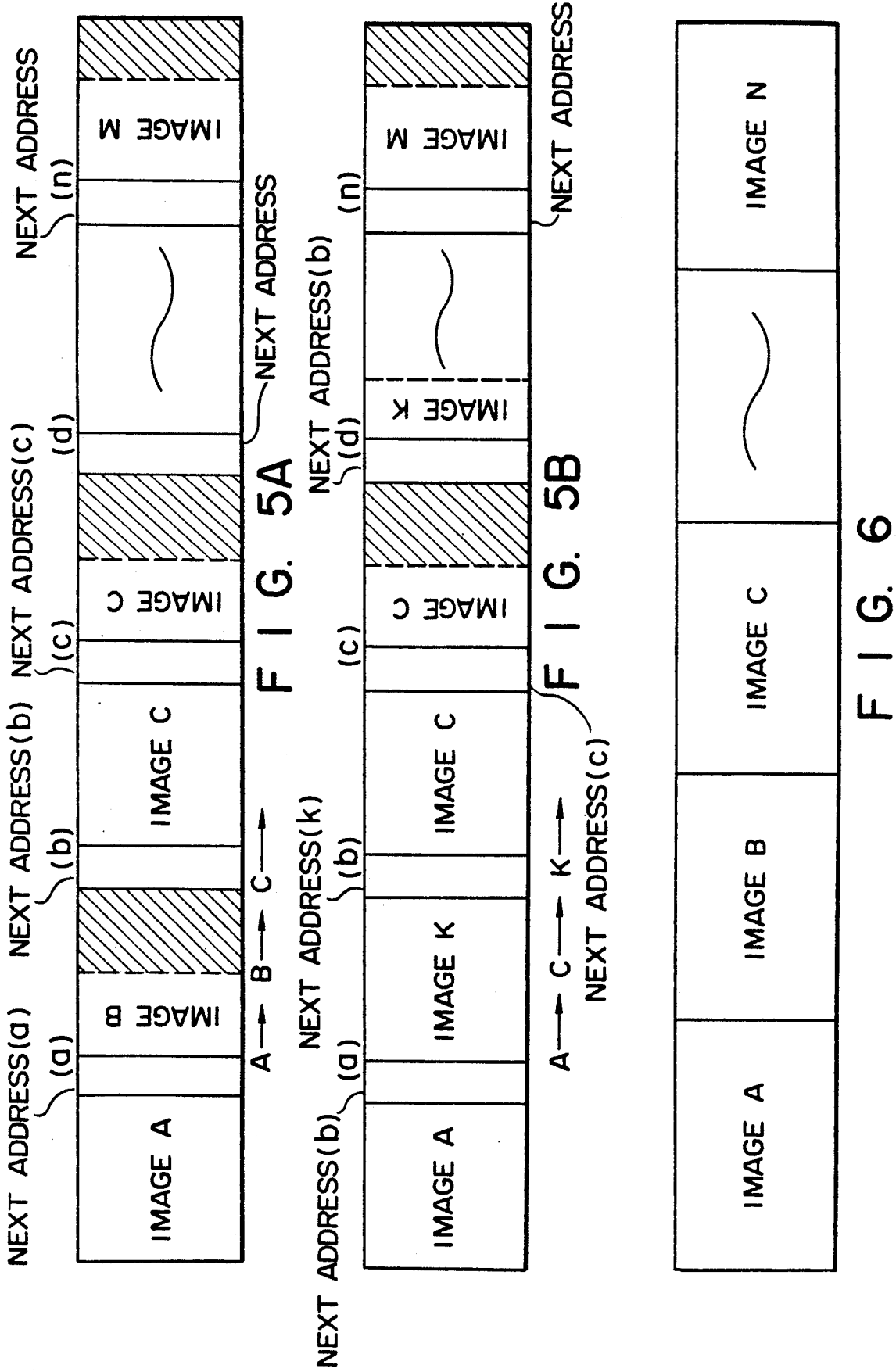

ELECTRONIC STILL CAMERA USING VARIABLE-LENGTH DATA COMPRESSION FOR STORING STILL IMAGE SIGNALS

BACKGROUND OF THE INVENTION

1. Field of the Invention

The present invention generally relates to an electronic still camera and, more particularly, to an electronic still camera for recording an electronically photographed still image in a predetermined recording medium such as a memory card upon data compression.

2. Description of the Related Art

With an improvement in performance of solid-state image pick-up elements such as a charge-coupled device (CCD), various electronic still cameras using solid-state image pick-up elements have recently been developed. An electronic still camera of this type is designed such that an electronic still image, which is electronically photographed by a CCD or the like, is recorded in a recording medium such as a floppy disk or a semiconductor memory card, and the recorded image signal is read out to be reproduced by a TV receiver or the like.

According to such an electronic still camera, unlike a conventional camera using a silver chloride film, a photographed image can be instantaneously monitored without film development and printing. Another advantage of this electronic still camera is that a still image signal can be directly transmitted through a data communication line.

Generally, in an electronic still camera using a floppy disk as a recording medium, about 50 recording tracks are concentrically formed on the floppy disk, and one electronic still image is recorded in each recording track.

An electronic still camera of this type, however, is designed to dynamically record electronic still images by means of a floppy disk driving mechanism. Therefore, problems are posed in terms of cost performance.

Under the circumstances, various attempts have recently been made to develop electronic still cameras using large-capacity memory cards which have been put into practical use with advances in semiconductor technology.

An electronic still camera using such a memory card as a recording medium is designed to sequentially record electronic still images in accordance with address control with respect to the image memory. This camera is advantageous in that still image signals can be statically recorded and read out at high speed.

That is, when a memory card of this type is used as a recording medium, still image signals can be recorded by only performing address control with respect to the image memory. Therefore, it is required for such a camera to record a large number of electronic still images by efficiently using the limited storage capacity of a memory card.

For this purpose, a method based on data compression has been studied. In this method, electronic still image data is compressed by variable-length encoding data compression such as an adaptive differential pulse code modulation (ADPCM) or an adaptive discreate cosine transform (ADCT) in accordance with the contents of the data, and the encoded compressed data is recorded in a memory card. According to such variable-length data compression encoding, since image data can be compressed in accordance with the contents of an image so as to be reduced in amount, a large number of electronic still images can be recorded in a memory card while the memory area on the memory card required to record one electronic still image is reduced.

When electronic still image data are to be recorded in a memory card upon data compression by variable-length encoding data compression, the data amount of each electronic still image to be subjected to data compression is determined in accordance with the contents of each image. Therefore, a user cannot know a proportion of the memory area in the memory card which already records electronic still images. In other words, a user cannot know an empty area in the memory card and the number of electronic still images to be photographed which can be further recorded.

Published Unexamined Japanese Patent Application No. 1-185080 discloses a technique providing an improvement with regard to this point. In this technique, whether a last photographing operation can be performed or not is determined by comparing the data amount of a scene to be photographed with the remaining storage capacity of the memory. If the last photographing operation cannot be performed, an alarm is generated.

In such a conventional technique, however, an alarm is generated only when it is determined that a last photographing operation cannot be performed. Therefore, during the photographing operations, a user cannot know in advance how many more electronic still images can be recorded.

SUMMARY OF THE INVENTION

It is, therefore, an object of the present invention to provide a new and improved electronic still camera with indication of recordable data amounts, which is designed to record electronic still images upon data compression by variable-length encoding data compression, in which the number of electronic still images which can be photographed and recorded is indicated to effectively allow a user to know whether an electronic still image to be newly photographed can be recorded or not.

According to the present invention, there is provided an electronic still camera comprising:

image pick-up means for generating an electronic still image signal;

A/D conversion means for converting the electronic still image signal generated by the image pick-up means into a digital signal;

data compressing means for causing variable-length encoding data compression to the digital signal converted by the A/D conversion means so as to obtain compressed image data;

recording means for recording the compressed image data obtained by the data compressing means in a recording medium having a predetermined recording capacity;

calculating means for calculating an estimated count of recordable electronic still images which can be recorded in the recording medium in accordance with quantitative data associated with the compressed image data recorded in the recording medium by the recording means and quantitative data associated with the recording capacity of the recording medium; and indicating means for indicating the estimated count of the recordable electronic still images calculated by the calculating means.

In addition to the above-described arrangement, according to the present invention, the electronic still camera includes means for obtaining maximum and minimum data amounts of image data recorded in the recording medium, obtaining a remaining data amount which can be recorded in the recording medium on the basis of the total data amount of the still images recorded in the recording medium, comparing the remaining data amount with the maximum, average, and minimum data amounts of the image data, and generating warnings of remaining amounts to a user stepwise in accordance with the comparison results.

According to the electronic still camera of the present invention which has the above-described functions, since estimated count data of images which can be recorded in a recording medium can be obtained and indicated from a remaining data area of the recording medium (a remaining recording capacity of the recording medium) in accordance with an average data amount per frame of electronic still images recorded upon variable-length encoding data compression, a user can effectively obtain a frame count (remaining frame count) of electronic still images which can be photographed and recorded in the recording medium.

In addition, a remaining recording capacity is compared with maximum, average, and minimum data amounts of already-recorded image data so as to indicate, in a stepwise manner, data representing whether an electronic still image to be newly photographed and recorded is recordable with a sufficient margin, recordable substantially without problems, or not recordable. Therefore, the user can effectively monitor a current photographing state. In accordance with this stepwise warning data, the user can take a proper measure, e.g., photographing and recording an electronic still image upon replacement of a recording medium.

Additional objects and advantages of the invention will be set forth in the description which follows, and in part will be obvious from the description, or may be learned by practice of the invention. The objects and advantages of the invention may be realized and obtained means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a schematic arrangement of an electronic still camera according to an embodiment of the present invention;

FIG. 2 is a block diagram showing a schematic arrangement of a main part of a modification of the electronic still camera in FIG. 1;

FIG. 3 is a flow chart showing a routine of data amount management of a system controller in the embodiment;

FIGS. 4A and 4B are views respectively showing recording formats of compressed electronic still image data in the embodiment; and FIGS. 5A and 5B and FIG. 6 are views respectively showing conventional recording formats in comparison with recording formats in the present invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

An electronic still camera employing a variable-length encoding data compression scheme according to an embodiment of the present invention will be described below with reference to the accompanying drawings.

FIG. 1 shows a schematic arrangement of the camera of the embodiment. Reference numeral 1 denotes a photographing lens optical system incorporating a diaphragm mechanism (aperture mechanism) 1a. The optical system 1 is driven by a lens system control section 3 which is controlled by a system controller 2. A charge-coupled device (CCD) 4 as a solid-state image pick-up element is arranged at an imaging position of an object image to be photographed by the optical system 1. The CCD 4 is driven under the control of a CCD control section 5. The CCD 4 accumulates a signal charge corresponding to the brightness of the object image formed on its imaging surface, and outputs it as an electronic still image signal.

Note that a half mirror 6 arranged midway along an optical path extending from the photographing lens optical system 1 to the imaging surface of the CCD 4 serves to guide part of the object image to a viewfinder system (not shown).

The system controller 2 includes a microcomputer and its peripheral circuits and controls focusing of the photographing lens optical system 1 with respect to an object to be photographed by driving the lens system control section 3 in accordance with object distance data detected by an auto focus (AF) sensor 7a and an AF calculating section 7b.

In addition, the system controller 2 performs aperture control with respect to an incident light amount by means of the diaphragm mechanism (aperture mechanism) 1a by driving the lens control section 3 in accordance with brightness data of the object detected by an auto exposure (AE) sensor 8a and an AE calculating section 8b. At the same time, the system controller 2 controls an operation of the CCD control section 5 so as to control the signal charge accumulation time of the CCD 4 in association with the aperture control. Exposure control with respect to an object image to be electronically photographed by the CCD 4 is executed by performing so-called shutter speed control through the control of the signal charge accumulation time of the CCD and the aperture control with respect to the incident light amount by means of the diaphragm mechanism (aperture mechanism) 1a.

Furthermore, the system controller 2 executes color adjustment (white balance adjustment) of an electronic still image to be electronically imaged and input by the CCD 4 by obtaining a color temperature of an object to be photographed in accordance with color data of the object detected by a white balance (WB) sensor 9a and a WB calculating section 9b. This color adjustment is executed by a preprocessor 10 which performs predetermined video processing such as gamma (γ) correction with respect to an electronic still image signal to be output from the CCD 4.

The AF sensor 7a, the AE sensor 8a, and the WB 9a for providing data to control these photosensor graphing operations may be arranged to detect object data independently of the photographing lens optical system 1, i.e., by a so-called external metering scheme, or may be arranged in the optical path of the optical system 1 so as to detect object data by a so-called TTL (through the lens) scheme.

The system controller 2 controls a sync signal generator 11 to generate various sync signals so as to control photographing operations by means of the CCD 4, and to control video signal processing by means of the preprocessor 10. The system controller 2 converts an electronic still image signal, which underwent predetermined video signal processing in the preprocessor 10, into a digital signal through an A/D converter 12, and temporarily stores it in a buffer memory 13. Variablelength encoding data compression such as ADPCM or ADCT of the electronic still image signal stored in the buffer memory 13 is performed by using a data compression encoder 14.

The electronic still image signal stored in the buffer memory 13 is sometimes encoded by a fixed-length data compression encoder 15 such as a DPCM unit prior to the above-described variable-length encoding data compression. In this case, the data compression encoder 14 performs variable-length data compression encoding of the electronic still image signal which underwent fixed-length data compression encoding, thus further compressing the data amount.

The electronic still image signal which underwent variable-length data compression encoding in this manner is recorded in an image memory 18 of a memory card 17 connected to the data compression encoder 14 through an interface 16.

A series of these data compression encoding operation of the electronic still image signal and recording of the electronic still image signal, which underwent data compression encoding, in the image memory 18 are executed under the control of the system controller 2.

In this embodiment, data compression of an electronic still image is performed by the data compression encoder 14 for performing variable-length encoding data compression such as ADPC or ADCT. As indicated by a dotted line in FIG. 1, however, a plurality of data compression encoders 15 using different data compression encoding schemes may be arranged, and may be selectively used in accordance with the contents of an object image to be photographed, thereby realizing variable-length data compression encoding.

The above description is associated with basic processing functions of the electronic still camera of the present invention.

FIG. 2 shows part of an arrangement of a data compression processing section. As shown in FIG. 2, a selector 19 may be connected to the input of the buffer memory 13 so that an electronic still image signal is input to the selector 19 through the A/D converter 12 or an electronic still image signal which has already been input to the selector 19 upon photography, has been stored in the buffer memory 13, and has undergone data compression encoding in the data compression encoder 14 may be selected and stored in the buffer memory 13. In this case if an electronic still image signal stored in the data buffer 13 has already undergone data compression encoding, the signal is directly output to the interface 16 through a selector 20. Otherwise, the electronic still image signal is subjected to data compression encoding through the data compression encoder 14 and is output to the interface 16 through the selector 20.

Assume, for example, that an electronic still image signal cannot be recorded because of lack of a remaining recording capacity of the image memory 18, as will be described later. With this arrangement, even in such a case, by storing the data compressed/encoded electronic still image signal in the buffer memory 13, the signal can be efficiently written in an image memory 18 of a new memory card 17 when the memory card 17 is replaced with the new memory card 17.

The electronic still camera of this embodiment has the following functions as characteristic features: a monitor function of monitoring the data amount of an electronic still image signal, which is subjected to variable-length data compression encoding and is recorded in the image memory 18 of the memory card 17 as described above, and a remaining recording capacity of the memory 18; and a function of providing various messages to a user on the basis of the data amount of the electronic still image signal and the remaining recording capacity of the image memory 18 which are monitored by the monitor function.

The monitor function comprises: a maximum data capacity calculating/determining section 21 for determining/detecting the maximum data amount (MAX) of the data amounts of electronic still image signals, which are subjected to variable-length data compression encoding and sequentially recorded in the image memory 18 under the control of the system controller 2 as described above; a minimum data capacity calculating/determining section 22 for determining/detecting the minimum data amount (MIN) of the data amounts; an average data capacity calculating/determining section 23 for determining/detecting an average data amount (AVE) of the electronic still image signals; a remaining capacity calculating/determining section 24 for determining/detecting a remaining recording capacity (REM of the image memory 18 in which no electronic still image data is recorded; and a count detecting section 25 for detecting the frame count of electronic still images recorded in the image memory 18.

The maximum data capacity calculating/determining section 21 obtains the maximum data amount (MAX) of the data amounts of data compressed/encoded electronic still image signals which are sequentially recorded in the image memory 18 by sequentially comparing the data amounts with each other under the control of the system controller 2. The minimum data capacity calculating/determining section 22 obtains the minimum data amount (MIN) of the data amounts of electronic still image signals which are sequentially recorded in the image memory 18 by sequentially comparing the data amounts with each other under the control of the system controller 2.

The average data capacity calculating/determining section 23 obtains an average data amount (AVE) per electronic still image by, e.g., dividing the total data amount (TOTAL) of electronic still image signals which are sequentially recorded in the image memory 18 by the frame count (COUNT) of the electronic still images recorded in the image memory 18 which is detected by the count detecting section 25 under the control of the system controller 2. The remaining capacity calculating/determining section 24 obtains a remaining capacity (REM) of the image memory 18 in which no electronic still data is recorded by subtracting the total data amount (TOTAL) obtained by the section 23 from the maximum recording capacity (maximum recordable data amount; CAP) of the image memory 18 under the control of the system controller 2.

The system controller 2 obtains an estimated recordable count (N) of electronic still images which can be newly photographed/recorded in the image memory 18 in accordance with data amounts (TOTAL, MAX, MIN, AVE, and REM) respectively detected by the calculating/determining sections 21, 22, 23, and 24, as will be described later. In addition, if a remaining recording capacity (REM) is smaller than, e.g., an average data amount (AVE), the system controller 2 indicates a warning to a user with respect to the next photographing operation. This warning indication is performed in such a manner that a warning message or the like is displayed by using a liquid crystal display (LCD) alarm section 26 arranged outside the electronic still camera main body or a finder alarm section 27 incorporated in the viewfinder system, or an alarm sound is generated by using an alarm sound mechanism.

FIG. 3 shows a routine of the system controller 2, in which the data amounts of data compressed/encoded electronic still images recorded in the image memory 18 are monitored, and processing such as indication of warning messages is performed.

This routine is started when a preparation for photography is performed by mounting the memory card 17 in the electronic still camera of the present invention. When the memory card 17 is mounted in the camera, initialization processing is started, and initialization for monitoring the data amounts of electronic still image signals recorded in the image memory 18 is performed (step b). This initialization is performed in such a manner that the maximum storage capacity (CAP) of the image memory 18 is read and input from the memory card 17, a remaining recording capacity (REM) of the image memory 18 is set, and data amounts (TOTAL, MAX, MIN, and AVE) for monitor control are respectively set to be "0".

A recording state of electronic still images in the image memory 18 is then determined, as will be described (step b), and whether an object to be photographed can be electronically photographed and recorded is checked (step c). If YES in step c, an object image is electronically photographed upon a release operation of the shutter of the electronic still camera, and the electronic still image signal is subjected to variable-length encoding data compression so as to be recorded in the image memory 18 of the memory card 17 (step d).

At this time, a variable-length encoded/compressed data amount X of the electronic still image signal recorded in the image memory 18 is read (step e), and at the same time, the frame count (COUNT) is incremented (step f). Thereafter, the data amount X of the photographed/recorded electronic still image signal is added to a total data amount (TOTAL) representing the data amount of images which have been recorded by this time (step g) This total data amount (TOTAL) is subtracted from the maximum recording capacity (CAP) of the image memory 18 so as to obtain a remaining recording capacity (REM) of the image memory 18 (step h).

Subsequently, the data amount X of the data compressed and stored electronic still image signal is compared with the maximum data amount (MAX) of the data amounts of the electronic still images which have been recorded so far in order to check whether the data amount X is larger than the maximum data amount (MAX) (step i). If the data amount X of the currently recorded image is larger than the maximum data amount (MAX), the maximum data amount (MAX) is updated by using the data amount X (step j).

In contrast to this, if the data amount X is less than the maximum data amount (MAX), the data amount X is compared with the previous minimum data amount (MIN) (step k). If the data amount X of the currently recorded image is smaller than the minimum data amount (MIN), the minimum data amount (MIN) is updated by using the data amount X (step l). It is apparent that the operations in steps j to l can be simultaneously performed by using a special hardware circuit.

After the above-described determination procedure, an average data amount (AVE) of an electronic still image signal subjected to variable-length compression encoding per electronic still image is calculated by dividing the total data amount (TOTAL) of the electronic still image signals recorded in the image memory 18 by the current frame count (COUNT). With such a procedure, the current maximum data amount (MAX), minimum data amount (MIN), and average data amount (AVE) of electronic still images, and the current remaining recording capacity (REM) of the image memory 18 are respectively obtained every time an electronic still image signal obtained by photography by means of the CCD 4 is subjected to data compression encoding and is recorded in the memory card 17.

For example, the determination processing of a recording state in step b is performed in practice as follows.

This processing is started by comparing the remaining recording capacity amount (REM) with the maximum data amount (MAX) of the electronic still images (step A). If it is determined in this comparison that the remaining recording capacity (REM) is larger than the maximum data amount (MAX), it is determined that an electronic still image signal to be obtained by the next photographing operation can be recorded in the memory card 17 with a sufficient margin upon data compression encoding. In this case, an estimated count (N) of photographing operations which can be performed in future is obtained by dividing the remaining recording capacity (REM) by the maximum data amount (MAX) (step B). Note that the estimated count (N) may be obtained by dividing the remaining recording capacity (REM) by the average data amount (AVE).

The estimated count (N) obtained in this manner is indicated on the LCD alarm section 26 or the like so as to inform a user of data of a remaining allowable count of photographing operations. Thus, the user can make a plan for subsequent photography on the basis of the data. In this case, the above-mentioned frame count (COUNT) data may be simultaneously indicated to inform the user of a past record of photography.

In contrast to this, if it is determined that the remaining recording capacity (REM) is smaller than the maximum data amount (MAX), the remaining recording capacity (REM) is compared with the average data amount (AVE) (step C). If it is determined that the remaining recording capacity (REM) is smaller than the maximum data amount (MAX) and is larger than the average data amount (AVE), it is generally determined that an electronic still image signal obtained by the next photographing operation can be recorded in the memory card 17 upon data compression encoding. In this case, however, since the remaining recording capacity (REM) may not be sufficient depending on the contents of an image, a light warning is given to the user with, e.g., an indication of a yellow mark (step D). With this indication, the user decides, depending on the current photographing state, whether to perform a photographing operation without replacement of the memory card 17 or to perform a photographing operation upon replacement of the memory card 17 so as to prevent an operation failure.

If it is determined that the remaining recording capacity (REM) is smaller than the average data amount (AVE), the remaining recording capacity (REM) is compared with the minimum data amount (MIN) (step E). If the remaining recording capacity (REM) is larger than the minimum data amount (MIN), it is generally considered that the next photographing operation is impossible. In this case, however, since the data amount of a photographed image is reduced upon data compression encoding, it is determined that it is possible to record a photographed image in the memory card 17 depending on its contents. In this case, a warning is given to the user with, e.g., an indication of a red mark, and a stronger warning is further given to the user with an alarm sound (step F). With this indication, the user performs a photographing operation upon replacement of the memory card 17 or performs a photographing operation without replacement in consideration of the current photographing state. In the latter case, however, it is highly possible that an electronic still image signal obtained by a photographing operation cannot be recorded in the memory card 17 because of lack of the remaining recording capacity (REM).

If it is determined that the remaining recording capacity (REM) is smaller than the minimum data amount (MIN), it is determined that the remaining recording capacity (REM) is completely insufficient for the next electronic still image. In this case, for example, a red mark is indicated, and at the same time, a strong warning which indicates that the memory is full is given to the user. In addition, a strong alarm sound that indicates inhibition of a photographing operation is generated (step G). Thus, a photographing operation with the currently used memory card 17 is inhibited (step H), and the flow keeps waiting for mounting of a new memory card 17. When this new memory card 17 is mounted, the system controller 2 is reset, and the routine is started again by performing the above-described initialization processing.

According to the electronic still camera having the above-described arrangement, when an electronic still image signal is to be recorded in a predetermined recording medium such as the image memory 18 of the memory card 17 upon variable-length encoding data compression, an area of the recording medium in which no data is recorded, i.e., a remaining recording capacity can be accurately and effectively detected, and warnings for photographing operations can be generated. In addition, a warning corresponding to each remaining recording capacity can be given to a user stepwise in accordance with a relationship between a history associated with the data amounts of already-recorded electronic still images, more specifically, a maximum data amount, a minimum data amount, an average data amount, and a total data amount, and the remaining recording capacity.

With this operation, the user can always monitor a current recording state of electronic still images while proceeding with subsequent photographing operations. The user, therefore, is free from inconvenience caused by a conventional electronic still camera, e.g., replacing the memory card 17 with a new one in haste upon knowing that a photographed image cannot be recorded only after it is photographed, or wasting a photographed electronic still image and performing a photographing operation again.

In the above-described embodiment, a remaining recording capacity (REM) and data amounts (TOTAL, MAX, MIN, and AVE) are determined in the main body side, and a warning indication or the like is provided on the basis of this determination. However, these data may be recorded in a predetermined recording area of the memory card 17 every time a one-frame electronic still image signal is recorded. In this case, when the memory card 17 is mounted, the main body side reads out these data from the memory card 17 and determines the above-mentioned data amounts, and controls a warning indication as needed.

With this system arrangement, before one memory card 17 is used up, it can be replaced with another memory card 17 as needed to record electronic still image signals. As a result, photographing operations can be performed by using a plurality of memory cards 17 in accordance with, e.g., purposes of photography or contents of photography. In addition, the camera main body can be commonly used by a plurality of users. In this manner, the operation of the camera can be greatly facilitated.

In the embodiment, the data amounts for monitor control are reset to "0" every time a memory card is inserted in the main body. However, the data amounts MAX, MIN, and AVE need not be reset for every inserting operation, and corresponding data may be continuously obtained. That is, photographic data may be statistically acquired and updated for each photographing operation as information associated with encoded compressed data regardless of mounting/dismounting of memory card. With this operation, since monitor control can be performed on the basis of acquired data which is increased in amount with an increase in data obtained by photography, the determination precision can be increased. In addition, determination control can be performed in accordance with a specific taste of photography of a user (contents of photography).

Note that the above-described recording of an electronic still image, which underwent variable-length encoding data compression, in the image memory 18 is performed by adding attribute data such as a data compression scheme, a data amount, and a record start address to the compressed image data, as shown in FIGS. 4A and 4B. In this case, if only image data are sequentially recorded in the memory 18 from the start address of the memory area, and their attribute data are recorded from the last address of the memory area so as to be reversed in order with respect to the image data as shown in FIG. 4A, the attribute data associated with the image data can be systematically managed, thus allowing effective management of the recorded image data. Alternatively, as shown in FIG. 4B, electronic still image signals obtained upon variable-length encoding data compression may be sequentially recorded in the image memory 18 from the start address of the memory area with a data size appended to each image signal.

Assume that a memory area is divided in advance and electronic still image signals are recorded as in a conventional technique. In the case of fixed-length encoding, each electronic still image signal can be sequentially recorded in a corresponding divided area, as shown in FIG. 6. However, in this case, the memory area may be wasted because of redundant recording depending on the contents of images. If electronic still images are recorded upon variable-length encoding data compression as shown in FIGS. 5A and 5B, some portions (hatched portions) of the divided areas are not used to record image data and hence are wasted. In addition, if entire image data cannot be recorded in one divided area, the image data must be recorded across two or more divided areas.

In comparison with the recording formats shown in FIGS. 5A and 5B, it is apparent that a memory area can be effectively used to record a large number of electronic still images by sequentially recording electronic still image signals upon variable-length encoding data compression based on the recording formats shown in FIGS. 4A and 4B. In this case, with the above-described processing functions, a user can effectively know how much memory area is left and whether the next electronic still image can be recorded in the area.

The present invention is not limited to the abovedescribed embodiment. For example, calculation of maximum, minimum, and average data amounts may be performed by a software program as well as by a special hardware circuit. The determination processing for a remaining recording capacity and a warning indication may be performed by means of a software program. Various changes and modifications can be made within the spirit and scope of the invention.

As has been described above, according to the present invention, an allowable count of recordable electronic still images upon variable-length encoding data compression can be indicated, and a proper warning can be provided when the remaining recording capacity of a recording medium is reduced. Therefore, a user can enjoy considerable practical advantages. For example, the user can always monitor a current photographing state with accuracy while performing photographing operations.

What is claimed is:

1. An electronic still camera for recording a plurality of one-frame electronic still image signals, comprising:
   image pick-up means for generating an electronic still image signal;
   A/D conversion means for converting the electronic still image signal generated by said image pick-up means into a digital signal;
   data compressing means for applying variable-length encoding data compression to the digital signal converted by said A/D conversion means so as to obtain compressed image data;
   recording means for recording the compressed image data obtained by said data compressing means in a recording medium having a predetermined recording capacity, with a plurality of one-frame compressed image data being assigned spaces, respectively, on said recording means, and wherein the size of a given space is determined in accordance with amount of data in the one-frame compressed image data recorded therein;
   calculating means for calculating an estimated count of recordable electronic still image frames which can be recorded in the recording medium in accordance with quantitative data per frame associated with the plurality of one-frame compressed image data recorded in the recording medium by said recording means and quantitative data associated with the recording capacity of the recording medium; and
   indicating means for indicating the estimated count of the recordable electronic still image frames calculated by said calculating means.

2. A camera according to claim 1, wherein said data compressing means includes means for selectively using a plurality of data compression encoders having different encoding data compression schemes.

3. A camera according to claim 1, wherein the recording medium includes a memory card.

4. A camera according to claim 1, wherein said calculating means includes means for calculating the estimated count of the recordable electronic still images by dividing a remaining recording capacity of the recording medium by at least one of maximum, minimum, and average capacities per frame of the image data.

5. A camera according to claim 4, wherein said calculating means includes means for calculating the remaining recording capacity of the recording medium by subtracting a total data amount of the image data which are previously recorded in the recording medium from the predetermined recording capacity of the recording medium.

6. A camera according to claim 4, wherein said calculating means includes means for determining and updating the maximum capacity per frame of the image data.

7. A camera according to claim 4, wherein said calculating means includes means for determining and updating the minimum capacity per frame of the image data.

8. A camera according to claim 4, wherein said calculating means includes means for calculating the average capacity per frame of the image data by dividing the total data amount of the image data previously recorded in the recording medium by a previous frame count.

9. A camera according to claim 4, wherein said calculating means includes means for comparing the remaining recording capacity of the recording medium with at least one of the maximum, minimum, and average capacities per frame of the image data, and generating a warning when it is determined that the remaining recording capacity is smaller than a corresponding one of the capacities.

10. A camera according to claim 9, wherein said calculating means includes means for comparing the remaining recording capacity of the recording medium with at least one of the maximum, minimum, and average capacities per frame of the image data, and changing the warning in state in accordance with the comparison results.

11. An electronic still camera comprising:
    image pick-up means for generating an electronic still image signal;
    A/D conversion means for converting the electronic still image signal generated by said image pick-up means into a digital signal;
    data compressing means for causing variable-length encoding data compression to the digital signal converted by said A/D conversion means so as to obtain compressed image data;
    recording means for recording the compressed image data obtained by said data compressing means in a recording medium having a predetermined recording capacity;
    calculating means for calculating an estimated count of recordable electronic still images which can be recorded in the recording medium by dividing a remaining recording capacity of the recording medium by at least one of maximum, minimum and average capacities per frame of the image data; and indicating means for indicating the estimated count of the recordable electronic still images calculated by said calculating means.

12. A camera according to claim 11, wherein said calculating means includes means for calculating the remaining recording capacity of the recording medium by subtracting a total data amount of the image data which are previously recorded in the recording medium from the predetermined recording capacity of the recording medium.

13. A camera according to claim 11, wherein said calculating means includes means for determining and updating the maximum capacity per frame of the image data.

14. A camera according to claim 11, wherein said calculating means includes means for determining and updating the minimum capacity per frame of the image data.

15. A camera according to claim 11, wherein said calculating means includes means for calculating the average capacity per frame of the image data by dividing the total data amount of the image data previously recorded in the recording medium by a previous frame count.

16. A camera according to claim 11, wherein said calculating means includes means for comparing the remaining recording capacity of the recording medium with at least one of the maximum, minimum, and average capacities per frame of the image data, and generating a warning when it is determined that the remaining recording capacity is smaller than a corresponding one of the capacities.

17. A camera according to claim 16, wherein said calculating means includes means for comparing the remaining recording capacity of the recording medium with at least one of the maximum, minimum, and average capacities per frame of the image data, and changing the warning in state in accordance with the comparison results.

18. A camera according to claim 11, wherein said data compressing means includes means for selectively using a plurality of data compression encoders having different encoding data compression schemes.

19. A camera according to claim 11, wherein the recording medium includes a memory card.

* * * * *